(12) United States Patent
Ahn

(10) Patent No.: US 7,941,820 B2
(45) Date of Patent: May 10, 2011

(54) METHOD AND APPARATUS FOR UPDATING PROGRAM GUIDE INFORMATION OF DIGITAL TV

(75) Inventor: Jeong Eun Ahn, Daegu (KR)

(73) Assignee: LG Electronics Inc., Seoul (KR)

( * ) Notice: Subject to any disclaimer, the term of this patent is extended or adjusted under 35 U.S.C. 154(b) by 231 days.

(21) Appl. No.: 11/514,191

(22) Filed: Sep. 1, 2006

(65) Prior Publication Data
US 2007/0055992 A1 Mar. 8, 2007

(30) Foreign Application Priority Data
Sep. 7, 2005 (KR) .................. 10-2005-0083392

(51) Int. Cl.
*G06F 13/00* (2006.01)
(52) U.S. Cl. ............ 725/50; 725/37; 725/38; 725/39; 725/56
(58) Field of Classification Search .......... 725/37, 725/38, 39, 50, 56
See application file for complete search history.

(56) References Cited

U.S. PATENT DOCUMENTS

| | | | | |
|---|---|---|---|---|
| 6,209,131 B1 * | 3/2001 | Kim et al. | .................. | 725/50 |
| 6,763,522 B1 * | 7/2004 | Kondo et al. | ................. | 725/39 |
| 2002/0135698 A1 * | 9/2002 | Shinohara | ................ | 348/473 |
| 2003/0101448 A1 * | 5/2003 | Kim | ................ | 725/9 |
| 2003/0208760 A1 * | 11/2003 | Sugai et al. | ................ | 725/50 |
| 2004/0058656 A1 * | 3/2004 | Chikaishi | ................ | 455/130 |
| 2005/0021828 A1 | 1/2005 | Kamen | | |
| 2009/0077588 A1 * | 3/2009 | Sugai | ................ | 725/44 |

FOREIGN PATENT DOCUMENTS

| KR | 10-2002-0015432 A | 2/2002 |
|---|---|---|
| WO | WO 99/35849 | 7/1999 |

OTHER PUBLICATIONS

Chinese Office Action dated Apr. 10, 2009 and English-language translation.
European Search Report for Application 06254632.0 dated Sep. 16, 2010.

* cited by examiner

*Primary Examiner* — Christopher Kelley
*Assistant Examiner* — Sahar A Baig
(74) *Attorney, Agent, or Firm* — KED & Associates, LLP

(57) ABSTRACT

A method of processing program guide information is provided. The method includes receiving one or more program guide informations contained in service information of a stream provided by a digital television broadcasting system, comparing the received program guide informations with one another, and updating one of the program guide informations to another one of the program guide informations.

14 Claims, 6 Drawing Sheets

Fig.2A

| TV | NOW | NEXT |
|---|---|---|
| 1 Doku/KiKa | 30 Jahre '60: Revolt... | Der Stramkrieg |
| 2 Info/3sat | Seitenblicke | delta |
| 3 ZOF | Kustenwache | heute nachtausgabe |
| 4 RaiSportSat | No Information | No Information |
| 5 RaiNotizie24 | No Information | No Information |
| 6 Rai Edu1 | No Information | No Information |

1 Doku/KiKa — 01:50 11 Mar
30 Jahre '68 : Revolte und Utopie Dutschk
01:45 ▬▭▭▭▭ 02:15

○ Radio  ◎ PR Change  ⓘ Info  ○ B Days

Fig.2B
220

| | | | |
|---|---|---|---|
| | 1  Doku/KiKa | | 01:50  11 Mar |
| 30 Jahre '68 : Revolte und Utopie Dutschk,Rudi,Rebell<br>01:45 ▬▭▭▭▭▭▭▭▭▭▭▭▷ 02:15 11 Mar | | | |

221   222

| TV | 1  Doku/KiKa | 2  Info/3sat | 3  ZOF |
|---|---|---|---|
| 01:45  Fri  11 | 30 Jahre '60: Revolte und Utopie Dutschk,R... | | |
| 02:15  Fri  11 | Der Stramkrieg | | |
| 03:00  Fri  11 | Arzte unterm Hakenkreuz 3/3 | | |
| 03:45  Fri  11 | Vince Crichton – Der mit den Elchen rohrt | | |
| 04:15  Fri  11 | Botswana – Abenteuer zwischen Wasser und... | | |
| 05:00  Fri  11 | Insel Hombroich | | |
| ○ Radio | ◎ PR Change | ① Info | ○ Now/Next    ○ Date |

METHOD AND APPARATUS FOR UPDATING PROGRAM GUIDE INFORMATION OF DIGITAL TV

BACKGROUND OF THE INVENTION

1. Field of the Invention

The present invention relates to a method and apparatus for updating program guide information, and more particularly, to a method and apparatus for updating program guide information, in which one of schedule information and now/next information of an electronic program guide (EPG) are updated to the other.

2. Description of the Related Art

A digital TV transport stream is a transmitted to users through a variety of media and methods such as a digital public service TV broadcasting system, a digital cable TV broadcasting system, and the like. In addition, the digital TV transport stream is also transmitted through a current analog public service TV broadcasting system, an analog cable TV broadcasting system, and the like.

As described above, the analog or digital transport stream is transmitted through a medium such as the public service broadcasting system and the wire broadcasting system. This means that several to hundreds of channels are assigned by each type.

Therefore, a digital TV tuner receives a large number of broadcasting programs through a large number of channels. In order to provide information on the large number of broadcasting programs to the users, an electronic program guide (EPG) has been proposed.

The digital TV tuner provides a variety of information to the users based on the EPG. Then, the user can obtain the program information using the EPG and make a program watching reservation or program recording reservation using the provided information. Particularly, the digital TV tuner can store the recorded program using an external or internal storage unit. Therefore, the digital TV tuner is widely used as an image display device that can realize a high quality image and sound based on a digital data processing.

Generally, one of the program guide information provided by the EPG is schedule and now/next information. The schedule and now/next information is transmitted together with service information of a digital TV broadcasting stream. The schedule information and the now/next information are contained in different tables.

There is overlapping information between the schedule information for guiding a broadcasting list and the now/next information for guiding the current and next broadcasting information. However, as described above, the schedule information and the now/next information are transmitted in a state where they are contained in different tables. In this case, one of the schedule information and the now/next information may not be received or the schedule information and the now/next information may be different from each other. Then, the users may be confused at the program information provided.

SUMMARY OF THE INVENTION

Accordingly, the present invention is directed to a method and apparatus for updating program guide information that substantially obviate one or more problems due to limitations and disadvantages of the related art.

An object of the present invention is to provide a method and apparatus for updating program guide information, which can improve the accuracy of the program guide information so that users are not confused at the program guide information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method of processing program guide information, the method including: receiving one or more program guide informations contained in service information of a stream provided by a digital television broadcasting system; comparing the received program guide informations with one another; and updating one of the program guide informations to another one of the program guide information according to the comparison result.

The method may further include decoding the stream provided by a digital television broadcasting system.

One or more program guide informations include main program guide information, and the updating includes updating the main program guide information to one of the received program guide information according to the comparison result.

The program guide information may include first program guide information contained in an EIT[sch] (event information table[schedule]) and second program guide information contained in an EIT[pf] (event information table[present/following]).

One of the first program guide information and the second program guide information may be set as the main program guide information, and the main program guide information may be updated to the other program guide information when the first program guide information is different from the second program guide information.

In another aspect of the present invention, there is provided a method of processing program guide information, the method including: receiving one or more information tables contained in service information of a stream provided by a digital television broadcasting system; identifying if pieces or all of program guide informations are omitted from the information table; and updating the omitted program guide information to program guide information contained in another information table when it is identified that pieces or all of the program guide informations are omitted from the information table.

The method may further include displaying the updated program guide information in an electronic program guide (EPG).

The method may further include decoding the stream provided by a digital television broadcasting system.

The information table may include a first information table of an EIT[sch] (event information table[schedule]) and a second information table of an EIT[pf] (event information table [present/following]), and the program guide information provided by the first information table and the program guide information provided by the second information table are partly identical to each other.

When the program guide information of the first information table is omitted, the omitted portion may be updated to the corresponding program guide information of the second information table.

When the program guide information of the second information table is omitted, the omitted portion may be updated to the corresponding program guide information of the first information table.

When the program guide information of the first information table and the program guide information of the second information table, which corresponds to the program guide information of the first information table are omitted, the omitted portions are updated to information representing that no program guide information exists.

In still another aspect of the present invention, there is provided a method of processing program guide information, the method including: receiving one or more information tables contained in service information of a stream provided by a digital television broadcasting system; identifying if pieces or all of the information tables are omitted; and updating, when there is information table that is not received, the portion displaying program guide informations included in the unreceived information table in EPG to the program guide informations of the received information table.

The identifying includes identifying if a first information table of an EIT[sch] (event information table[schedule]) and a second information table of an EIT[pf] (event information table[present/following]) are received.

The service information may include flag bits representing if the EIT[sch] information and EIT[pf] information exist.

When it is identified that the first information table is not receive, a portion corresponding to the first information table in EPG is updated to the program guide information of the second information table.

When it is identified that the second information table is not receive, a portion corresponding to the second information table in EPG is updated to the program guide information of the first information table.

In still another aspect of the present invention, there is provided a program guide information processing system including: a tuner for receiving digital broadcasting signals of a predetermined channel and one or more program guide informations of corresponding broadcasting provided from a digital broadcasting system; a signal processing unit for receiving the digital broadcasting signals and the one or more program guide informations and performing a signal processing operation; and a control unit for receiving and comparing the one or more program guide informations with each other.

The control unit updates one of the program guide informations to another one of the program guide informations according to the comparison result.

The program guide information may include first program guide information contained in an EIT[sch] (event information table[schedule]) and second program guide information contained in an EIT[pf] (event information table[present/following]).

One of the first program guide information and the second program guide information is set as main program guide information, and the main program guide information is updated to the other program guide information when the first program guide information is different from the second program guide information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 2A and 2B are views illustrating a relationship between schedule information and now/next information of an EPG;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
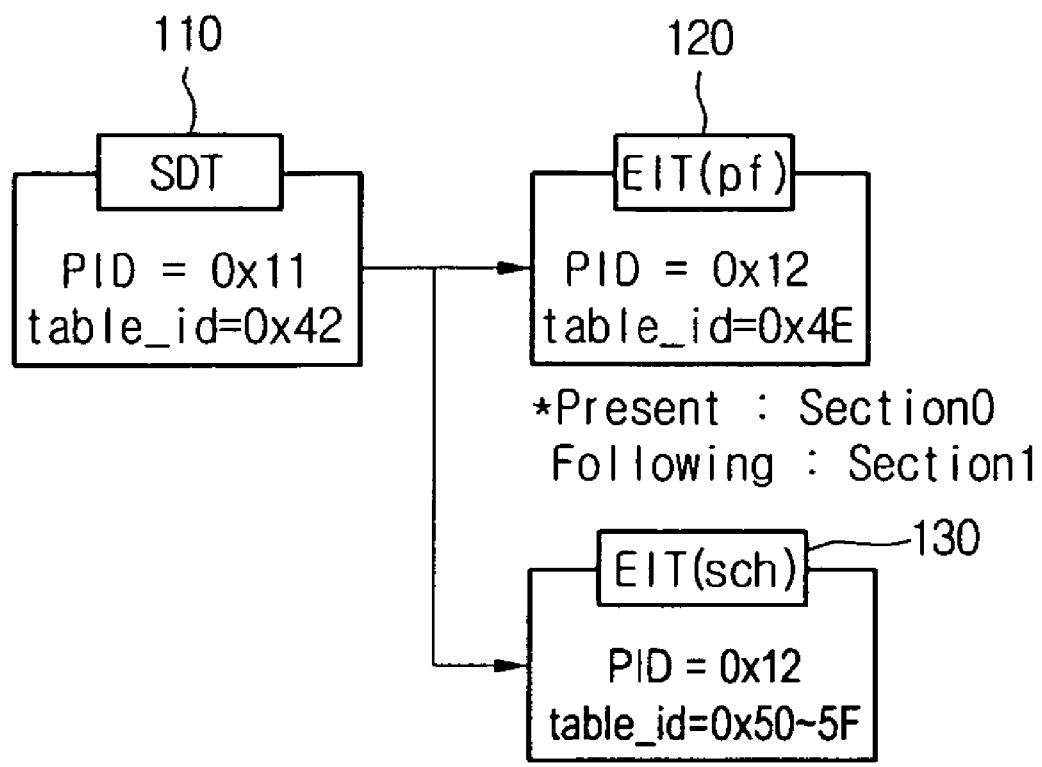
FIG. 1 is a view illustrating an example of a schedule and now/next information table of an EPG.

FIG. 1 shows an example of a program guide information table used in the present invention. It can be identified using a service description table (SDT) 110 if an EIT(pf) (Event Information Table (Present/Following)) including now/next information and an EIT(sch)(Event Information Table (Schedule)) including schedule information are received.

For example, the reception of the EIT(pf) and EIT(sch) can be identified through a flag bit. In FIG. 1, when "EIT_present_following_flag" is 1, it is identified that the EIT(pf) 120 is received. When "EIT_schedule_flag" is 1, it is identified that the EIT(sch) 130 is received.

As described above, the schedule information and the now/next information are received in the SI of the digital broadcasting stream through different tables (e.g., the EIT(sch) and the EIT(pf)), respectively. Based on the received schedule information and now/next information, the program guide information provided to the user can be formed as in FIGS. 2A and 2B.

FIGS. 2A and 2B shows screens displaying the schedule information and now/next information of the EPG.

As shown in FIG. 2A, on a now/next information screen 210 of the program guide, now program information 211 and next program information 212 are displayed. In addition, as shown in FIG. 2B, on a schedule information screen 220, the schedule information is displayed. A portion of the program schedule information may overlap with the now/next information. For example, information 221 corresponding to current program information 211 of the now/next information and information 222 corresponding to the next program information 212 of the now/next information are contained in the schedule information.

However, when any one of the EIT(pf) and EIT(sch) is not received or the contents of the two corresponding program guide information are different from each other, the display contents for the identical information are different from each other. Therefore, the user may be confused at this.

Considering the above, one or more pieces of the received program guide information are compared with each other and one of the pieces of the program guide information is updated to others according to the comparison results. For example, one of the EIT(pf) and EIT(sch) is set as a main table and contents of two corresponding program information are different from each other, the content of the program information of the main table may be updated to the corresponding program information of other table.

In addition, when any one of the EIT(pf) and EIT(sch) is not received or a part of the information of the EIT(pf) or EIT(sch) is omitted, any one of pieces of the corresponding program information may not exist. In this case, a portion corresponding to the not-existing program guide information is updated to the corresponding program guide information in the EPG.

According to a method for updating the program guide information, the corresponding program information of another table is copied and the copied information is recorded on the corresponding portion of the main table.

Figure 3:
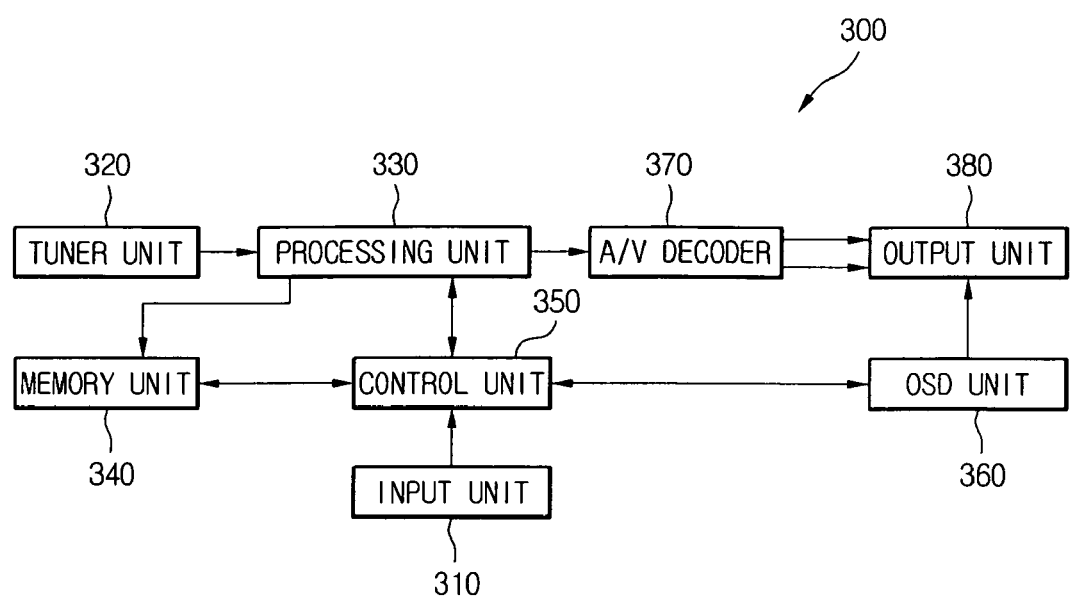
FIG. 3 is a block diagram of a digital TV tuner according to the present invention.
Figure 4:
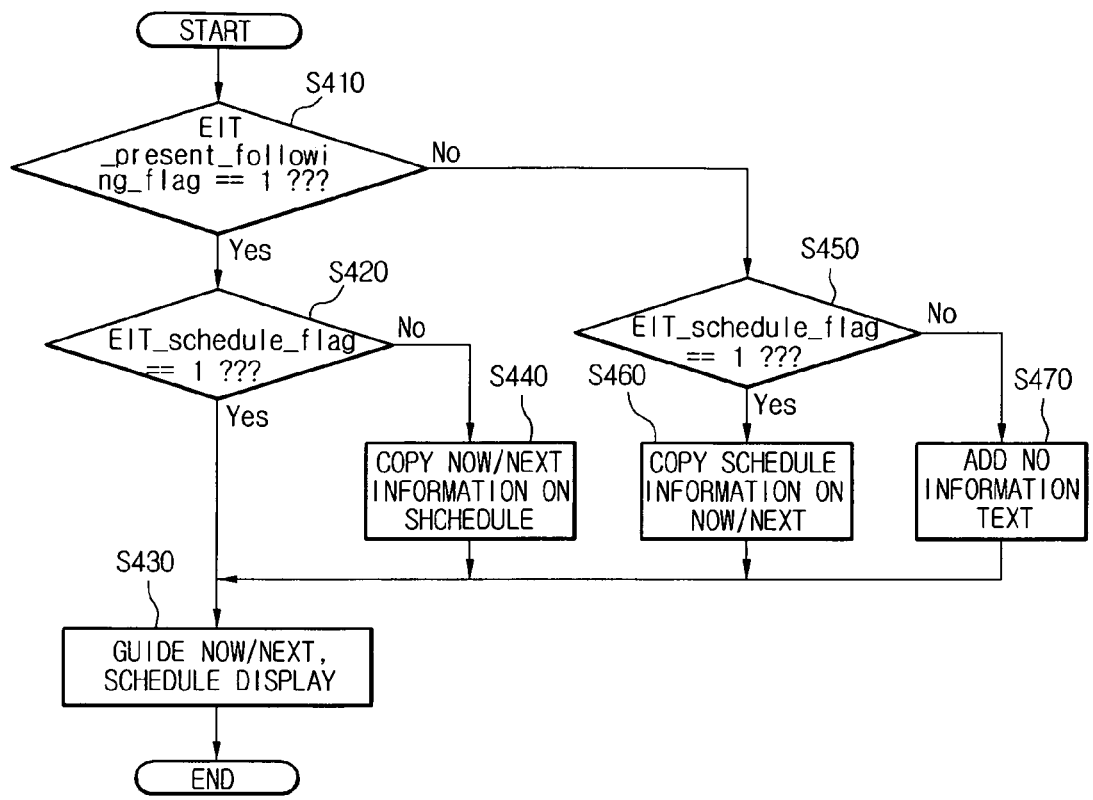
FIG. 4 is a flowchart of a method for updating program guide information according to an embodiment of the present invention.

FIG. 3 is a block diagram of a digital TV tuner according to the present invention and FIG. 4 is a flowchart of a method for updating program guide information according to an embodiment of the present invention.

Referring to FIG. 3, the digital TV tuner 300 includes an input unit 310 such as a remote controller for operating a user's device, a tuner unit 320 for receiving a digital transport stream (TS), and a signal processing unit 330 receiving the TS information from the tuner unit 320 and processing the same. The digital TV tuner 300 further includes a memory unit 340 for storing a variety of data in the TS information and the device operation state information, a control unit 350 for controlling a variety of functions of the digital TV tuner 300 and processing information relating to the programs, and an audio/video (A/V) decoder 370 for decoding the digital TS. The digital TV tuner 300 further includes an OSD unit 360 for generating an OSD signal to display informations relating to the program on the screen, and an output unit 380 for outputting an image signal, an audio signal, and EPG according to signals transmitted from the A/V decoder 380 and the OSD unit 360.

The tuner unit 320 selects a digital TS for a specific channel selected by the user through the input unit 310, receives the TS information, and supplies the received TS information to the process unit 330. The processing unit 330 analyzes and processes the inputted TS information and supplies the processed digital TS to the A/V decoder 370. The A/V decoder 370 receives the TS, decodes the received TS into the analog audio and video signals, and supplies the decoded image and audio signals to the output unit 380.

The signal processing unit 330 separates the program guide from the TS and stores the same in the memory unit 340. The control unit 350 can read the program guide information stored in the memory unit 340. The control unit 350 also compares the pieces of the program guide information with each other and performs the updating operation between the pieces of the program guide information according to the comparison result. The updating is performed by the control unit 350 based on the EPG. Signals according to the updating result are transmitted to the OSD unit 360. The OSD unit 360 transmits the OSD signal to the output unit 380 to display the EPG on the screen.

The operation of the digital TV tuner will now be described with reference to the flowchart of FIG. 4.

When one or more information tables contained in the service information of a stream provided from the digital TV broadcasting system are received, the received and not receive information tables can be identified. For example, it is first identified if the EIT(pf) containing the now/next information is received (S410). The reception of the EIT(pf) can be identified using a flag bit provided together with the stream.

As shown in FIG. 4, when "EIT_present_following_flag" is 1, it is identified that the now/next information is normally received.

When it is identified that the now/next information is normally received in S410, it is identified if the EIT(sch) containing the schedule information is received (S420). When it is identified that the now/next information is not received in S410, the identification of the reception of the EIT(sch) is done in S450. The reception of the EIT(sch) can be identified by identifying the state of the "EIT_schedule_flag." That is, when "EIT_schedule_flag" is 1, it is identified that the schedule information is normally received.

When the now/next information and the schedule information are normally received in S410 and S420, the now/next information and the schedule information are displayed in the EPG (S430).

When S410, S420 and S430 are successively performed, the schedule information and the now/next information will be provided.

Meanwhile, when the schedule information is not received in S420, the now/next information of the EIT(pf) is copied and recorded on the corresponding portion of the EIT(sch) (S430). Then, the schedule information becomes the program guide information updated on the basis of the now/next information. Next, according to the updated program guide information, the now/next information and the schedule information are displayed (S430).

Meanwhile, when it is identified in S410 that no now/next information exists, it is determined if the schedule information exists (S450).

In S450, when it is determined that the schedule information exists, the schedule information of the EIT(sch) is copied and recorded on the corresponding portion of the EIT(pf) (S460). Next, the program guide information is displayed (S430). Accordingly, the now/next information becomes the program guide information updated according to the schedule information.

Meanwhile, when it is determined in S450 that no schedule information exists, S470 is processed. In S470, information representing no program guide information exists, e.g., a text such as "no information," is recorded on the corresponding portions of the EIT(sch) and EIT(pf). Then, the program guide information is displayed (S430) to let the user know that no program information exists.

FIG. 4 shows a case where the program guide information is updated by copying rest information when any one of two pieces of the information does not exist. Particularly, a case where it is identified if the information tables containing the program guide information are received and the updating is performed according to the identification result is exampled. However, the present invention is not limited to this case. Even when the information tables are received, a part or all of the program guide information may be omitted from any one of the information tables. In this case, it is identified if the program guide information exists and a portion corresponding to the omitted program guide information is updated to the program guide information corresponding to other information table according to the identification result.

Meanwhile, two pieces of the program guide information are compared with each other. When the two pieces of the program guide information represents different information for the identical content, one of the two pieces of the information is updated to the other that is relatively important.

For example, both of the EIT(pf) and EIT(sch) are received and corresponding pieces of the program guide information are compared with each other. When it is identified according to the comparison result that the corresponding pieces are different from each other, the now/next information is set as main information and the now/next information is updated to the schedule information. Alternatively, the schedule information is set as main information and the schedule information is updated to the now/next information.

In addition, the program guide information may be updated to program guide information the user prefers to others. That is, the system is set such that it reflects the user's preference and weightings the specific program guide information to which the rest program guide information is updated.

Figure 5:
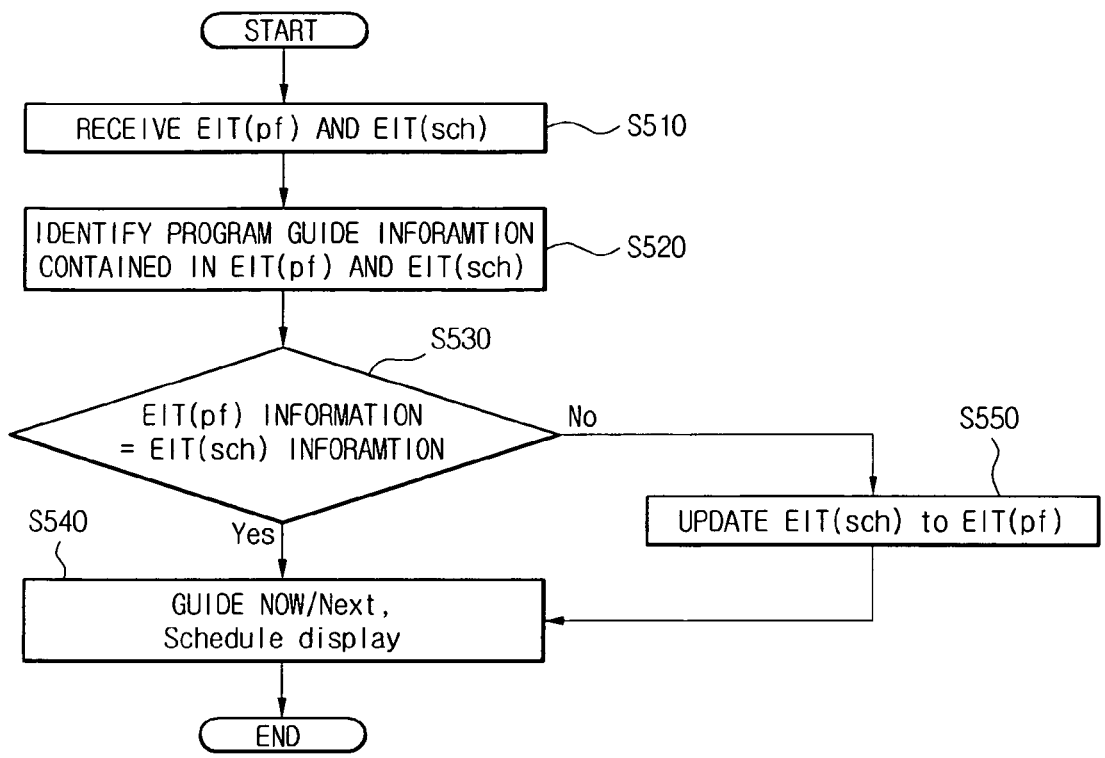
FIG. 5 is a flowchart of a method for updating program guide information according to another embodiment of the present invention.

The above-described embodiment can be performed as shown in FIG. 5.

Information tables (e.g., the EIT(pf) and EIT(sch)) provided from the digital TV broadcasting system are received (S510) and the program guide information of the EIT(pf) and EIT(sch) is identified (S520).

As described above, there is an overlapping portion between the EIT(pf) and EIT(sch). When there is corresponding portions between the EIT(pf) information and EIT(sch) information, the corresponding portion of the EIT(pf) information is compared with the corresponding portion of the EIT(sch) information to identify if they are identical to each other (S530). It is identified that they are identical, the information of the now/next information and the schedule information are displayed (S540).

On the contrary, when it is identified that they are different, The EIT(pf) information is updated to the EIT(sch) information or the EIT(sch) information is updated to the EIT(pf). Preferably, the EIT(sch) information is set as main program guide information and when the corresponding portion of the EIT(pf) information is different from the corresponding portion of the EIT(sc) information, the main program guide information (e.g., the EIT(sch) information) is updated to the EIT(pf) information.

According to the present invention, since pieces of the program guide information can be in accord with each other, proper program guide information can be provided to the user even when a portion of the information is omitted. Furthermore, even when pieces of the information are different from each other for the identical content, they can be in accord with each other, hereby preventing the user form being confused at that.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of processing program guide information, the method comprising:
   receiving service information (SI), by a digital receiving device, of a stream provided by a digital television broadcasting system;
   extracting a first information table and a second information table from the currently received service information; identifying if pieces or all of program guide informations are omitted from the first information table and the second information table; and updating the omitted program guide information to program guide information contained in another information table when it is identified that pieces or all of the program guide informations are omitted from the first information table and the second information table, and wherein the first information table and the second information table are provided in the Service Information (SI) of the currently received digital broadcasting stream through different tables.

2. The method according to claim 1, further comprising displaying the updated program guide information in an electronic program guide (EPG).

3. The method according to claim 1, further comprising decoding the stream provided by the digital television broadcasting system.

4. The method according to claim 1, wherein the first information table means an EIT[sch] (event information table [schedule]) and the second information table means an EIT [pf] (event information table[present/following]), and
   the program guide information provided by the first information table and the program guide information provided by the second information table are partly identical to each other.

5. The method according to claim 4, wherein, when the program guide information of the first information table and the program guide information of the second information table, which corresponds to the program guide information of the first information table are omitted, the omitted portions are updated to information representing that no program guide information exists.

6. A method of processing program guide information, the method comprising:
   receiving service information (SI), by a digital receiving device, of a stream provided by a digital television broadcasting system;
   extracting a first information table and a second information table from the currently received service information; identifying if the first information table and the second information are received; and updating, when there is information table that is not received, the unreceived portion displaying program guide informations included in the unreceived information table in an electronic program guide (EPG) to the program guide informations of the received information table, wherein the first information table and the second information table are provided in the service information (SI) of the currently received digital broadcasting stream through different tables.

7. The method according to claim 6, wherein the first information table means an EIT[sch] (event information table [schedule]) and the second information table means an EIT [pf] (event information table[present/following]).

8. The method according to claim 7, wherein the service information includes flag bits representing when the EIT[sch] information and EIT[pf] information exist.

9. A program guide information processing system comprising:
   a tuner for receiving digital broadcasting signal of a predetermined channel and a first program guide information and a second program guide information of corresponding broadcasting provided from a digital broadcasting system;
   a signal processing unit for receiving the digital broadcasting signal and the first program guide information and the second program guide information and performing a signal processing operation; and
   a control unit for receiving and comparing the first program guide information and the second program guide information with each other;
   wherein the control unit updates the program guide informations mutually according to a result of comparing the first program guide information and the second program guide information, and wherein the first program guide information and the second program guide information are provided in a service information (SI) of the currently received digital broadcasting stream through different tables.

10. The system according to claim 9, wherein the program guide information includes first program guide information contained in an EIT[sch] (event information table[schedule]) and second program guide information contained in an EIT[pf] (event information table[present/following]).

11. The system according to claim 10, wherein one of the first program guide information and the second program guide information is set as main program guide information, and the main program guide information is updated to the other program guide information when the first program guide information is different from the second program guide information.

12. The method according to claim 1, wherein, when the program guide information of the first information table is omitted, the omitted portion is updated to the corresponding program guide information of the second information table, and when the program guide information of the second information table is omitted, the omitted portion is updated to the corresponding program guide information of the first information table.

13. The method according to claim 6, wherein, when it is identified that the first information table is not received, a portion corresponding to the first information table in the EPG is updated to the program guide information of the second information table, and when it is identified that the second information table is not received, a portion corresponding to the second information table in the EPG is updated to the program guide information of the first information table.

14. The system according to claim 9, wherein, when the first program guide information table is omitted or unreceived, the control unit updates the first program guide information using the second program guide information, and when the second program guide information is omitted or unreceived, the control unit updates the second program guide information using the first program guide information.

* * * * *